B. G. LAMME.
PROTECTIVE DEVICE FOR COMMUTATOR TYPE ALTERNATING CURRENT MOTORS.
APPLICATION FILED JUNE 30, 1904.
923,666.
Patented June 1, 1909.
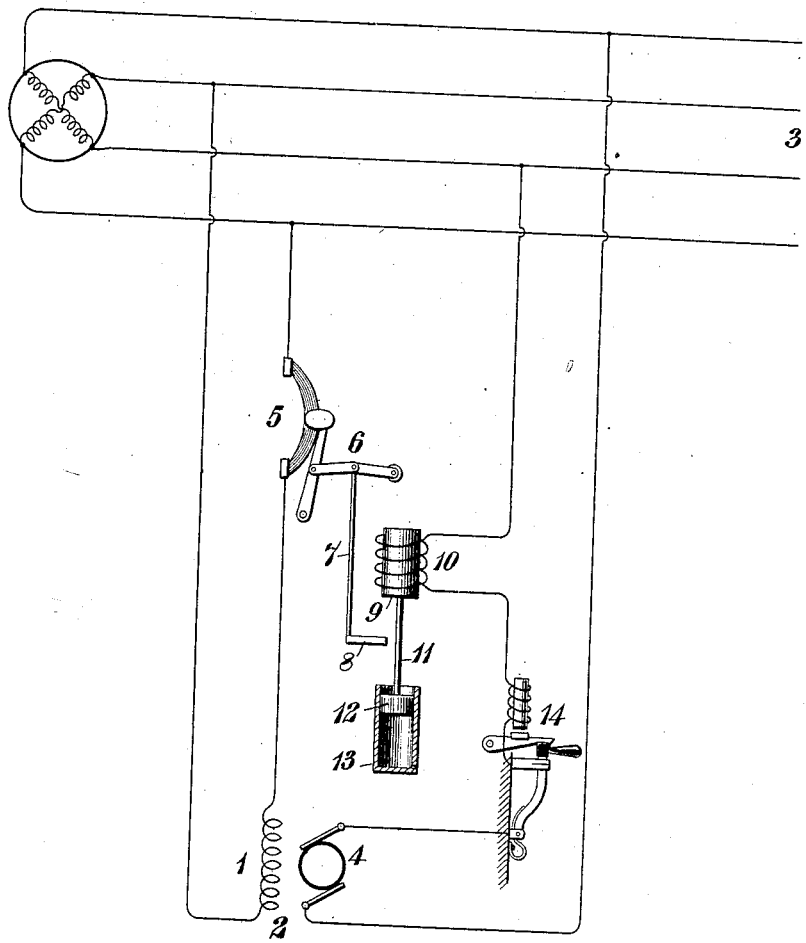
WITNESSES:
C. L. Belcher
Chas Harkness
INVENTOR
Benjamin G. Lamme
BY
Wesley G. Sloan
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

PROTECTIVE DEVICE FOR COMMUTATOR-TYPE ALTERNATING-CURRENT MOTORS.

No. 923,666.

Specification of Letters Patent.

Patented June 1, 1909.

Application filed June 30, 1904. Serial No. 214,822.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Protective Devices for Commutator-Type Alternating-Current Motors, of which the following is a specification.

My invention relates to alternating current motors in which current is supplied to the windings of both members and in which the current to the rotative member or armature is supplied through a commutator substantially in the manner utilized in those operated by direct currents, and more especially my invention relates to motors of this character in which the field magnets are shunt wound or separately excited, instead of being connected in series with the armature windings.

The object of my invention is to provide a protecting means whereby the field magnet circuit will be automatically opened a predetermined length of time after interruption of the armature circuit is effected.

In motors of the character indicated, the coils of the armature which are short-circuited by the commutator brushes constitute secondaries to the field magnet winding, and since the latter is energized by alternating currents, secondary currents are generated in the former. Such currents are not injurious so long as the armature is in motion, since the short circuit is transferred from coil to coil and the heat generated by the current in the short circuit is therefore distributed throughout the armature windings. If the armature is topped, however, by interrupting its circuit without opening the field magnet circuit, the short circuit through the commutator brush is confined to a single coil or local portion of the armature winding, and if the short circuit is maintained for any considerable period, the heat generated may cause serious damage.

In the single figure of the accompanying drawing, I have illustrated diagrammatically a supply circuit, a motor adapted for operation therefrom at substantially constant speed and protective means constructed to operate in accordance with my invention.

As here illustrated, the field magnet winding 1 of the constant speed motor 2 is connected across one phase of a two-phase distributing circuit 3, and the armature 4 of the motor is connected across the other phase of the two-phase circuit. The motor so connected, if properly designed, will operate at substantially constant speed and so long as both the armature and field magnet circuits are closed, the operation will be satisfactory. If, however, the armature circuit should be opened, either accidentally or otherwise, whereby the armature would come to rest, serious damage to the motor might result by reason of the conditions hereinbefore mentioned. In order to avoid such injury, I include in the circuit of the field magnet an automatic circuit breaker 5, which may be of any suitable, well-known construction. In the present instance, I have indicated the breaker as locked in closed position by means of the toggle joint structure 6 and depending from the toggle joint locking device is a rod 7 having a lateral projection 8 at its lower end in position to be engaged by the core 9 of a solenoid 10, this solenoid being located in the armature circuit and the core being connected by means of a rod 11 to the piston 12 of a dash-pot 13. I have also indicated a circuit breaker 14 in the armature circuit.

So long as the armature circuit remains closed, the lifting action of the solenoid will serve to retain the core in substantially the position indicated. If the armature circuit is opened, however, the core will descend by the action of gravity, which may be supplemented by a spring, if desired, but the descending movement will be retarded by the dash-pot, so that if it is desired to manipulate any controlling or switching device in the armature circuit for the purpose of again closing that circuit or for any other purpose, the opening of the field magnet circuit will be sufficiently delayed to permit of such operation. If, however, the armature circuit is not closed, the solenoid core will, at the end of a predetermined interval of time, engage the projection 8 on the rod 7 and thus trip the circuit breaker 5.

The specific form of protective apparatus here shown is merely indicative of any apparatus suitable for the purpose and is obviously susceptible of many modifications and variations within the scope of my invention.

I claim as my invention:

1. The combination with a constant speed, commutator-type motor, of an interrupter for the field magnet circuit and means for actuating said interrupter to quickly open the said circuit a predetermined interval of time after the armature circuit is broken.

2. The combination with a commutator-type motor having armature and field magnet windings separately supplied with alternating currents, of an interrupter in the field magnet circuit, a tripping device therefor that is retained in inactive relation by the armature current, and means for delaying the action of the tripping device until a predetermined interval of time has elapsed after the opening of the armature circuit.

3. The combination with a two-phase alternating current circuit and a commutator-type motor having its armature and field magnet windings connected to the respective phases of said circuit, of an interrupting device for the field magnet circuit and operating means therefor which is rendered inactive so long as the armature circuit is closed and which operates said device a predetermined interval of time after the armature circuit is opened.

4. The combination with an alternating current circuit and a commutator-type motor having its field magnet and armature windings separately supplied by said circuit, of an interrupting device for the field magnet circuit and a controlling means therefor which insures quick operation of the interrupting device a predetermined interval of time after the armature circuit is opened.

5. The combination with an alternating current circuit and a motor having its armature and field magnet windings separately supplied by said circuit, of a breaker for the field magnet circuit and tripping mechanism for said breaker comprising a coil in the armature circuit, an armature, a breaker-releasing member adapted to be actuated by said armature after a given amount of lost motion, and a dash-pot for said armature.

In testimony whereof, I have hereunto subscribed my name this 28th day of June, 1904.

BENJ. G. LAMME.

Witnesses:
E. M. STEUART,
BIRNEY HINES.